United States Patent
Aliverti et al.

(10) Patent No.: US 10,467,744 B2
(45) Date of Patent: Nov. 5, 2019

(54) SYSTEMS AND METHODS TO AUTOMATICALLY DETERMINE GARMENT FIT

(71) Applicant: L.I.F.E. CORPORATION S.A., Luxembourg (LU)

(72) Inventors: Andrea Aliverti, Como (IT); Gianluigi Longinotti-Buitoni, Riverside, CT (US)

(73) Assignee: L.I.F.E. Corporation S.A., Luxembourg (LU)

(*) Notice: Subject to any disclaimer, the term of this patent is extended or adjusted under 35 U.S.C. 154(b) by 0 days.

(21) Appl. No.: 15/202,833

(22) Filed: Jul. 6, 2016

(65) Prior Publication Data

US 2016/0314576 A1    Oct. 27, 2016

Related U.S. Application Data

(63) Continuation-in-part of application No. PCT/US2015/010343, filed on Jan. 6, 2015.

(Continued)

(51) Int. Cl.
| | | |
|---|---|---|
| A41H 1/02 | (2006.01) | |
| G06T 7/00 | (2017.01) | |
| G06Q 30/06 | (2012.01) | |
| G06T 3/40 | (2006.01) | |
| G06T 7/60 | (2017.01) | |
| G06K 9/00 | (2006.01) | |

(52) U.S. Cl.
CPC ............ *G06T 7/0004* (2013.01); *A41H 1/02* (2013.01); *G06K 9/00369* (2013.01); *G06Q 30/0621* (2013.01); *G06T 3/40* (2013.01); *G06T 7/60* (2013.01); *G06K 9/0061* (2013.01); *G06T 2207/30124* (2013.01); *G06T 2207/30196* (2013.01)

(58) Field of Classification Search
None
See application file for complete search history.

(56) References Cited

U.S. PATENT DOCUMENTS

| | | |
|---|---|---|
| 3,591,526 A | 7/1971 | Kawashima |
| 3,793,716 A | 2/1974 | Smith Johannsen |

(Continued)

FOREIGN PATENT DOCUMENTS

| | | |
|---|---|---|
| CN | 1294504 A | 5/2001 |
| CN | 1985761 A | 12/2006 |

(Continued)

OTHER PUBLICATIONS

Mauri et al.; U.S. Appl. No. 15/335,403 entitled "Calibration packaging apparatuses for physiological monitoring garments," filed Oct. 26, 2016.

(Continued)

*Primary Examiner* — Vikkram Bali
(74) *Attorney, Agent, or Firm* — Shay Glenn LLP

(57) ABSTRACT

Systems and methods for automatically determining of garment sizing (e.g., fit) using a images including video images. The method may perform non-contact estimations of garment fit from visual (e.g., video) input by receiving an video of the subject's head and face and profile and determining a scaling factor from the subject's intraocular spacing and using this scaling factor when analyzing images of other body regions to determine garment sizing.

20 Claims, 7 Drawing Sheets

Related U.S. Application Data

(60) Provisional application No. 61/924,086, filed on Jan. 6, 2014.

(56) References Cited

U.S. PATENT DOCUMENTS

| | | |
|---|---|---|
| 4,624,817 A | 11/1986 | Gusack et al. |
| 4,710,981 A | 12/1987 | Sanchez |
| 4,823,240 A | 4/1989 | Shenker |
| 4,867,166 A | 9/1989 | Axelgaard et al. |
| 5,036,865 A | 8/1991 | Keaton |
| 5,111,818 A | 5/1992 | Suzuki et al. |
| 5,148,002 A | 9/1992 | Kuo et al. |
| 5,163,006 A | 11/1992 | Deziel |
| 5,241,300 A | 8/1993 | Buschmann |
| 5,280,265 A | 1/1994 | Kramer et al. |
| 5,352,315 A | 10/1994 | Carrier et al. |
| 5,379,461 A | 1/1995 | Wilmers |
| 5,395,508 A | 3/1995 | Jolly et al. |
| 5,557,263 A | 9/1996 | Fisher et al. |
| 5,581,492 A | 12/1996 | Janik |
| 5,635,909 A | 6/1997 | Cole |
| 5,678,448 A | 10/1997 | Fullen et al. |
| 5,694,645 A | 12/1997 | Triplette |
| 5,749,365 A | 5/1998 | Magill |
| 5,802,607 A | 9/1998 | Triplette |
| 5,824,996 A | 10/1998 | Kochman et al. |
| 5,845,644 A | 12/1998 | Hughes et al. |
| 5,853,005 A | 12/1998 | Scanlon |
| 5,865,740 A | 2/1999 | Kelly et al. |
| 5,903,222 A | 5/1999 | Kawarizadeh et al. |
| 5,906,004 A | 5/1999 | Lebby et al. |
| 5,912,653 A | 6/1999 | Fitch |
| 5,921,674 A | 7/1999 | Koczi |
| 6,016,476 A | 1/2000 | Maes et al. |
| 6,019,877 A | 2/2000 | Dupelle et al. |
| 6,024,575 A | 2/2000 | Ulrich |
| 6,047,203 A | 4/2000 | Sackner et al. |
| 6,080,690 A | 6/2000 | Lebby et al. |
| 6,097,297 A | 8/2000 | Fard |
| 6,136,127 A | 10/2000 | De Bastiani |
| 6,144,120 A | 11/2000 | Doi et al. |
| 6,210,771 B1 | 4/2001 | Post et al. |
| 6,232,879 B1 | 5/2001 | Tyren |
| 6,259,399 B1 | 7/2001 | Krasner |
| 6,319,015 B1 | 11/2001 | Faunce |
| 6,325,066 B1 | 12/2001 | Hughes et al. |
| 6,341,504 B1 | 1/2002 | Istook |
| 6,349,201 B1 | 2/2002 | Ford |
| 6,415,176 B1 | 7/2002 | Scheirer et al. |
| 6,436,064 B1 | 8/2002 | Kloecker |
| 6,490,534 B1 * | 12/2002 | Pfister .................. A41H 1/00 382/173 |
| 6,561,814 B2 | 5/2003 | Tilbury et al. |
| 6,563,424 B1 | 5/2003 | Kaario |
| 6,642,467 B2 | 11/2003 | Farringdon |
| 6,668,380 B2 | 12/2003 | Marmaropolous et al. |
| 6,713,733 B2 | 3/2004 | Kochman et al. |
| 6,729,025 B2 | 5/2004 | Farrell et al. |
| 6,792,124 B2 | 9/2004 | Tilbury et al. |
| 6,801,140 B2 | 10/2004 | Mantyjarvi et al. |
| 6,830,344 B2 | 12/2004 | Reho et al. |
| 6,895,261 B1 | 5/2005 | Palamides |
| 6,930,608 B2 | 8/2005 | Grajales et al. |
| 6,968,075 B1 * | 11/2005 | Chang ................ G06K 9/00214 382/111 |
| 6,970,731 B1 | 11/2005 | Jayaraman et al. |
| 6,982,115 B2 | 1/2006 | Poulos et al. |
| 7,020,508 B2 | 3/2006 | Stivoric et al. |
| 7,034,685 B2 | 4/2006 | Fabre et al. |
| 7,161,084 B2 | 1/2007 | Sandbach |
| 7,173,437 B2 | 2/2007 | Hervieux et al. |
| 7,191,803 B2 | 3/2007 | Orr et al. |
| 7,210,939 B2 | 5/2007 | Marmaropolous et al. |
| 7,211,053 B2 | 5/2007 | Marmaropolous et al. |
| 7,230,610 B2 | 6/2007 | Jung et al. |
| 7,248,756 B2 | 7/2007 | Ebbesen et al. |
| 7,250,547 B1 | 7/2007 | Hofmeister et al. |
| 7,299,034 B2 | 11/2007 | Kates |
| 7,299,964 B2 | 11/2007 | Jayaraman et al. |
| 7,319,895 B2 | 1/2008 | Klefstad-Sillonville et al. |
| 7,320,947 B2 | 1/2008 | Child et al. |
| 7,321,785 B2 | 1/2008 | Harris |
| 7,324,841 B2 | 1/2008 | Reho et al. |
| 7,344,379 B2 | 3/2008 | Marmaropolous et al. |
| 7,348,645 B2 | 3/2008 | Xu |
| 7,365,031 B2 | 4/2008 | Swallow et al. |
| 7,377,133 B2 | 5/2008 | Sandbach et al. |
| 7,388,166 B2 | 6/2008 | Marmaropolous et al. |
| 7,429,959 B2 | 9/2008 | Gerder et al. |
| 7,448,874 B2 | 11/2008 | Willis |
| 7,476,104 B2 | 1/2009 | Marmaropoulos et al. |
| 7,559,768 B2 | 7/2009 | Marmaropoulos et al. |
| 7,578,195 B2 | 8/2009 | DeAngelis et al. |
| 7,616,112 B2 | 11/2009 | Miller, III |
| 7,645,220 B2 | 1/2010 | Hoffman et al. |
| 7,665,288 B2 | 2/2010 | Karayianni et al. |
| 7,683,643 B2 | 3/2010 | Qi et al. |
| 7,712,373 B2 | 5/2010 | Nagle et al. |
| 7,715,873 B1 | 5/2010 | Biere et al. |
| 7,719,007 B2 | 5/2010 | Thompkins et al. |
| 7,732,002 B2 | 6/2010 | Kodas et al. |
| 7,753,685 B2 | 7/2010 | Lee et al. |
| 7,753,845 B2 | 7/2010 | Gopinathan et al. |
| 7,760,082 B2 | 7/2010 | Wong et al. |
| 7,769,412 B1 | 8/2010 | Gailloux |
| 7,770,473 B2 | 8/2010 | Von Lilienfeld-Toal et al. |
| 7,779,656 B2 | 8/2010 | Dias et al. |
| 7,783,334 B2 | 8/2010 | Nam et al. |
| 7,787,726 B2 | 8/2010 | Ten Eyck et al. |
| 7,849,888 B2 | 12/2010 | Karayianni et al. |
| 7,862,624 B2 | 1/2011 | Tran |
| 7,870,761 B2 | 1/2011 | Valentine et al. |
| 7,872,557 B2 | 1/2011 | Seibert |
| 7,878,030 B2 | 2/2011 | Burr |
| 7,880,607 B2 | 2/2011 | Olson et al. |
| 7,891,020 B2 | 2/2011 | Von Bluecher |
| 7,914,108 B2 | 3/2011 | Konno et al. |
| 7,933,554 B2 | 4/2011 | Hoyt et al. |
| 7,955,696 B2 | 6/2011 | Baikerikar et al. |
| 7,976,480 B2 | 7/2011 | Grajales et al. |
| 7,982,613 B2 | 7/2011 | Zheng |
| 7,983,876 B2 | 7/2011 | Vock et al. |
| 8,008,606 B2 | 8/2011 | Kaiserman et al. |
| 8,024,023 B2 | 9/2011 | Tolvanen |
| 8,032,199 B2 | 10/2011 | Linti et al. |
| 8,063,307 B2 | 11/2011 | Bukshpun et al. |
| 8,099,258 B2 | 1/2012 | Alten et al. |
| 8,140,143 B2 | 3/2012 | Picard et al. |
| 8,146,171 B2 | 4/2012 | Chung et al. |
| 8,162,857 B2 | 4/2012 | Lanfermann et al. |
| 8,186,231 B2 | 5/2012 | Graumann et al. |
| 8,214,008 B2 | 7/2012 | Hassonjee et al. |
| 8,228,202 B2 | 7/2012 | Buchner et al. |
| 8,253,586 B1 | 8/2012 | Matak |
| 8,262,217 B2 | 9/2012 | Furukawa |
| 8,263,215 B2 | 9/2012 | Burr et al. |
| 8,267,862 B2 | 9/2012 | Jeong et al. |
| 8,308,489 B2 | 11/2012 | Lee et al. |
| 8,331,097 B2 | 12/2012 | Yang et al. |
| 8,340,740 B2 | 12/2012 | Holzer et al. |
| 8,348,841 B2 | 1/2013 | Varadan |
| 8,348,865 B2 | 1/2013 | Jeong et al. |
| 8,362,882 B2 | 1/2013 | Heubel et al. |
| 8,373,079 B2 | 2/2013 | Walkington |
| 8,398,546 B2 | 3/2013 | Pacione et al. |
| 8,403,845 B2 | 3/2013 | Stivoric et al. |
| 8,416,579 B2 | 4/2013 | Biesheuvel et al. |
| 8,475,371 B2 | 7/2013 | Derchak et al. |
| 8,739,397 B2 | 6/2014 | Nagata et al. |
| 8,798,708 B2 | 8/2014 | Tremblay |
| 8,862,431 B2 | 10/2014 | Hodge |
| 8,925,393 B2 | 1/2015 | Cannard et al. |
| 8,945,328 B2 | 2/2015 | Longinotti-Buitoni et al. |

(56) References Cited

U.S. PATENT DOCUMENTS

| | | |
|---|---|---|
| 8,948,839 B1 | 2/2015 | Longinotti-Buitoni et al. |
| 8,954,129 B1 | 2/2015 | Schlegel et al. |
| 9,282,893 B2 | 3/2016 | Longinotti-Buitoni et al. |
| 9,566,032 B2 | 2/2017 | Babaeizadeh et al. |
| 9,979,547 B2 | 5/2018 | Starner et al. |
| 10,154,791 B2 | 12/2018 | Longinotti-Buitoni et al. |
| 2002/0093515 A1 | 7/2002 | Fay et al. |
| 2003/0139692 A1 | 7/2003 | Barrey et al. |
| 2004/0115430 A1 | 6/2004 | Leonard |
| 2004/0249242 A1 | 12/2004 | Lau et al. |
| 2005/0029680 A1 | 2/2005 | Jung et al. |
| 2005/0058744 A1 | 3/2005 | Steinberg et al. |
| 2005/0067816 A1 | 3/2005 | Buckman |
| 2005/0107722 A1 | 5/2005 | Ozaki et al. |
| 2005/0228234 A1 | 10/2005 | Yang |
| 2006/0007059 A1 | 1/2006 | Bell |
| 2006/0062993 A1 | 3/2006 | Ogata et al. |
| 2006/0080182 A1 | 4/2006 | Thompson et al. |
| 2006/0124470 A1 | 6/2006 | Zama et al. |
| 2006/0139165 A1 | 6/2006 | Bader |
| 2006/0155182 A1 | 7/2006 | Mazzarolo |
| 2007/0000912 A1 | 1/2007 | Aisenbrey |
| 2007/0046720 A1 | 3/2007 | Konno et al. |
| 2007/0049842 A1 | 3/2007 | Hill et al. |
| 2007/0151312 A1 | 7/2007 | Bruce et al. |
| 2007/0153363 A1 | 7/2007 | Gruner |
| 2007/0177770 A1 | 8/2007 | Derchak et al. |
| 2007/0178716 A1 | 8/2007 | Glaser et al. |
| 2007/0202765 A1 | 8/2007 | Krans et al. |
| 2007/0293781 A1 | 12/2007 | Sims et al. |
| 2008/0045815 A1 | 2/2008 | Derchak et al. |
| 2008/0058744 A1 | 3/2008 | Tippey et al. |
| 2008/0064964 A1 | 3/2008 | Nagata et al. |
| 2008/0083720 A1 | 4/2008 | Gentile et al. |
| 2008/0083721 A1 | 4/2008 | Kaiserman et al. |
| 2008/0083740 A1 | 4/2008 | Kaiserman et al. |
| 2008/0171914 A1 | 7/2008 | Ouwerkerk et al. |
| 2008/0177168 A1 | 7/2008 | Callahan et al. |
| 2008/0234561 A1 | 9/2008 | Roesicke et al. |
| 2008/0241391 A1 | 10/2008 | Kim et al. |
| 2008/0246629 A1 | 10/2008 | Tsui et al. |
| 2008/0255794 A1 | 10/2008 | Levine |
| 2008/0258921 A1 | 10/2008 | Woo et al. |
| 2008/0269629 A1 | 10/2008 | Reiner |
| 2008/0269652 A1 | 10/2008 | Reiner |
| 2008/0287769 A1 | 11/2008 | Kurzweil et al. |
| 2008/0287770 A1 | 11/2008 | Kurzweil et al. |
| 2008/0294019 A1 | 11/2008 | Tran |
| 2009/0012408 A1 | 1/2009 | Nagata et al. |
| 2009/0018410 A1 | 1/2009 | Coene et al. |
| 2009/0105795 A1 | 4/2009 | Minogue et al. |
| 2009/0112078 A1 | 4/2009 | Tabe |
| 2009/0157327 A1 | 6/2009 | Nissila |
| 2009/0227856 A1 | 9/2009 | Russell et al. |
| 2009/0281394 A1 | 11/2009 | Russell et al. |
| 2009/0286055 A1 | 11/2009 | Pourdeyhimi et al. |
| 2010/0004720 A1 | 1/2010 | Li et al. |
| 2010/0029598 A1 | 2/2010 | Kopitz et al. |
| 2010/0041974 A1 | 2/2010 | Ting et al. |
| 2010/0059274 A1 | 3/2010 | Ives et al. |
| 2010/0071205 A1 | 3/2010 | Graumann et al. |
| 2010/0077528 A1 | 4/2010 | Lind et al. |
| 2010/0112195 A1 | 5/2010 | Kodas et al. |
| 2010/0113910 A1 | 5/2010 | Brauers et al. |
| 2010/0149567 A1 | 6/2010 | Kanazawa et al. |
| 2010/0185062 A1 | 7/2010 | Salazar et al. |
| 2010/0185398 A1 | 7/2010 | Berns et al. |
| 2010/0194815 A1 | 8/2010 | Furukawa |
| 2010/0198038 A1 | 8/2010 | Nagata et al. |
| 2010/0234715 A1 | 9/2010 | Shin et al. |
| 2010/0274100 A1 | 10/2010 | Behar et al. |
| 2010/0292598 A1 | 11/2010 | Roschk et al. |
| 2010/0309209 A1 | 12/2010 | Hodgins et al. |
| 2010/0312071 A1 | 12/2010 | Schenk |
| 2010/0324405 A1 | 12/2010 | Niemi et al. |
| 2011/0000412 A1 | 1/2011 | Chung et al. |
| 2011/0015498 A1 | 1/2011 | Mestrovic et al. |
| 2011/0032103 A1 | 2/2011 | Bhat et al. |
| 2011/0042125 A1 | 2/2011 | Lee et al. |
| 2011/0087115 A1 | 4/2011 | Sackner et al. |
| 2011/0092795 A1 | 4/2011 | Derchak |
| 2011/0100683 A1 | 5/2011 | Bhattacharya et al. |
| 2011/0102304 A1 | 5/2011 | Nelson |
| 2011/0115624 A1 | 5/2011 | Tran |
| 2011/0125064 A1 | 5/2011 | Shyr |
| 2011/0130643 A1 | 6/2011 | Derchak et al. |
| 2011/0144457 A1 | 6/2011 | Coulon |
| 2011/0183068 A1 | 7/2011 | Yamakawa et al. |
| 2011/0184270 A1 | 7/2011 | Russell et al. |
| 2011/0259638 A1 | 10/2011 | Sherrill et al. |
| 2011/0267578 A1 | 11/2011 | Wilson |
| 2011/0277206 A1 | 11/2011 | Sokolowski |
| 2011/0288605 A1 | 11/2011 | Kaib et al. |
| 2012/0024833 A1 | 2/2012 | Klewer et al. |
| 2012/0029299 A1 | 2/2012 | Deremer et al. |
| 2012/0030935 A1 | 2/2012 | Slade et al. |
| 2012/0031431 A1 | 2/2012 | Carlson et al. |
| 2012/0035426 A1 | 2/2012 | Mielcarz et al. |
| 2012/0071039 A1 | 3/2012 | Debock et al. |
| 2012/0071793 A1 | 3/2012 | Gal |
| 2012/0078127 A1 | 3/2012 | McDonald et al. |
| 2012/0088986 A1 | 4/2012 | David et al. |
| 2012/0101357 A1 | 4/2012 | Hoskuldsson et al. |
| 2012/0118427 A1 | 5/2012 | Brookstein et al. |
| 2012/0127687 A1 | 5/2012 | Allee et al. |
| 2012/0136231 A1 | 5/2012 | Markel |
| 2012/0143093 A1 | 6/2012 | Stirling et al. |
| 2012/0144551 A1 | 6/2012 | Guldalian |
| 2012/0144561 A1 | 6/2012 | Begriche et al. |
| 2012/0144934 A1 | 6/2012 | Russell et al. |
| 2012/0146797 A1 | 6/2012 | Oskin et al. |
| 2012/0158074 A1 | 6/2012 | Hall |
| 2012/0165645 A1 | 6/2012 | Russell et al. |
| 2012/0165717 A1 | 6/2012 | Al Khaburi |
| 2012/0184826 A1 | 7/2012 | Keenan et al. |
| 2012/0188158 A1 | 7/2012 | Tan et al. |
| 2012/0197224 A1 | 8/2012 | Chagger |
| 2012/0215076 A1 | 8/2012 | Yang et al. |
| 2012/0223833 A1 | 9/2012 | Thomas et al. |
| 2012/0233751 A1 | 9/2012 | Hexels |
| 2012/0238845 A1 | 9/2012 | Yang |
| 2012/0246795 A1 | 10/2012 | Scheffler et al. |
| 2012/0255166 A1 | 10/2012 | Kim et al. |
| 2012/0324616 A1 | 12/2012 | Hyde et al. |
| 2012/0330109 A1 | 12/2012 | Tran |
| 2013/0013331 A1 | 1/2013 | Horseman |
| 2013/0019372 A1 | 1/2013 | Esses |
| 2013/0019383 A1 | 1/2013 | Korkala et al. |
| 2013/0041272 A1 | 2/2013 | Guillen et al. |
| 2013/0053674 A1 | 2/2013 | Volker |
| 2013/0066168 A1 | 3/2013 | Yang et al. |
| 2013/0072777 A1 | 3/2013 | Tremblay |
| 2013/0077263 A1 | 3/2013 | Oleson et al. |
| 2013/0079860 A1 | 3/2013 | Besio |
| 2013/0144111 A1 | 6/2013 | Wang et al. |
| 2013/0179288 A1 | 7/2013 | Moses et al. |
| 2013/0211208 A1 | 8/2013 | Varadan |
| 2013/0212900 A1 | 8/2013 | Stewart |
| 2013/0231711 A1 | 9/2013 | Kalb |
| 2013/0244121 A1 | 9/2013 | Gogotsi et al. |
| 2013/0245423 A1 | 9/2013 | Derchak et al. |
| 2013/0281795 A1 | 10/2013 | Varadan |
| 2013/0314668 A1 | 11/2013 | Haddadi et al. |
| 2014/0061273 A1 | 3/2014 | Bullivant et al. |
| 2014/0100436 A1 | 4/2014 | Brunner et al. |
| 2014/0135593 A1 | 5/2014 | Jayalth et al. |
| 2014/0135602 A1 | 5/2014 | Lemke et al. |
| 2014/0172134 A1 | 6/2014 | Casillas et al. |
| 2014/0182880 A1 | 7/2014 | Simenhaus et al. |
| 2014/0206948 A1 | 7/2014 | Romem |
| 2014/0303470 A1 | 10/2014 | Tsukada et al. |
| 2014/0312027 A1 | 10/2014 | Augustine et al. |
| 2015/0143601 A1 | 5/2015 | Longinotti-Buitoni et al. |
| 2015/0250420 A1 | 9/2015 | Longinotti-Buitoni et al. |

(56) References Cited

U.S. PATENT DOCUMENTS

| | | |
|---|---|---|
| 2015/0289820 A1 | 10/2015 | Miller et al. |
| 2015/0342266 A1 | 12/2015 | Cooper et al. |
| 2016/0148531 A1 | 5/2016 | Bleich et al. |
| 2016/0262462 A1 | 9/2016 | Kawamura et al. |
| 2018/0004924 A1 | 1/2018 | Tieu et al. |
| 2018/0067516 A1 | 3/2018 | Longinotti-Buitoni et al. |
| 2018/0376586 A1 | 12/2018 | Longinotti-Buitoni et al. |

FOREIGN PATENT DOCUMENTS

| | | |
|---|---|---|
| CN | 101917903 A | 12/2010 |
| CN | 102970925 A | 3/2013 |
| EP | 1057923 A1 | 12/2000 |
| EP | 1335831 A1 | 8/2003 |
| EP | 1478249 A1 | 11/2004 |
| EP | 1509128 A1 | 3/2005 |
| EP | 1622512 A2 | 2/2006 |
| EP | 1709903 A1 | 10/2006 |
| EP | 1905112 A2 | 4/2008 |
| EP | 1907075 A2 | 4/2008 |
| EP | 1925718 A2 | 5/2008 |
| EP | 2025369 A2 | 2/2009 |
| EP | 2191737 A1 | 6/2010 |
| EP | 2196142 A1 | 6/2010 |
| EP | 2217145 A1 | 8/2010 |
| EP | 2314744 A2 | 4/2011 |
| EP | 3037036 A1 | 6/2016 |
| JP | 2008229084 A | 10/2008 |
| WO | WO 90/06189 A1 | 6/1990 |
| WO | WO 00/16493 A1 | 3/2000 |
| WO | WO 01/01855 A1 | 1/2001 |
| WO | WO03/000015 A2 | 1/2003 |
| WO | WO 03/060449 A1 | 7/2003 |
| WO | WO 2004/076731 A1 | 9/2004 |
| WO | WO 2004/107831 A2 | 12/2004 |
| WO | WO 2005/032447 A2 | 4/2005 |
| WO | WO 2005/067796 A1 | 7/2005 |
| WO | WO 2005/096133 A1 | 10/2005 |
| WO | WO 2006/064447 A2 | 6/2006 |
| WO | WO 2006/102538 A2 | 9/2006 |
| WO | WO 2007/056557 A1 | 5/2007 |
| WO | WO 2008/137046 A1 | 11/2008 |
| WO | WO 2008/153786 A1 | 12/2008 |
| WO | WO 2009/040696 A1 | 4/2009 |
| WO | WO 2009/112281 A1 | 9/2009 |
| WO | WO 2010/038176 A1 | 4/2010 |
| WO | WO 2010/044018 A1 | 4/2010 |
| WO | WO 2010/058346 A2 | 5/2010 |
| WO | WO 2010/085671 A1 | 7/2010 |
| WO | WO 2010/085688 A1 | 7/2010 |
| WO | WO2010/096907 A1 | 9/2010 |
| WO | WO 2010/120945 A1 | 10/2010 |
| WO | WO 2011/092620 A1 | 8/2011 |
| WO | WO 2011/156095 A2 | 12/2011 |
| WO | WO2012/011068 A1 | 1/2012 |
| WO | WO 2012/060524 A1 | 5/2012 |
| WO | WO 2012/066056 A1 | 5/2012 |
| WO | WO 2012/073076 A1 | 6/2012 |
| WO | WO 2012/073230 A1 | 6/2012 |
| WO | WO 2012/083066 A2 | 6/2012 |
| WO | WO 2012/104484 A1 | 8/2012 |
| WO | WO 2012/110954 A1 | 8/2012 |
| WO | WO 2012/112186 A1 | 8/2012 |
| WO | WO 2012/113014 A1 | 8/2012 |
| WO | WO 2012/140079 A1 | 10/2012 |
| WO | WO 2012/140522 A2 | 10/2012 |
| WO | WO 2012/168836 A2 | 12/2012 |
| WO | WO 2012/176193 A1 | 12/2012 |
| WO | WO 2014/025430 A2 | 2/2014 |
| WO | WO 2014/075682 A1 | 5/2014 |
| WO | WO 2014/204323 A1 | 12/2014 |
| WO | WO 2015/103620 A1 | 7/2015 |
| WO | WO 2015/138515 A1 | 9/2015 |
| WO | WO2016/035350 A1 | 3/2016 |

OTHER PUBLICATIONS

Longinotti-Buitoni et al; U.S. Appl. No. 15/324,152 entitled "Garments having stretchable and conductive ink," filed Jan. 5, 2017.

Longinotti-Buitoni et al.; U.S. Appl. No. 15/516,138 entitled "Devices and methods for use with physiological monitoring garments," filed Mar. 31, 2017.

Aliverti et al.; Compartmental analysis of breathing in the supine and prone positions by optoelectronic plethysmography; Ann Biomed Eng; 29(1):60-70; Jan. 2001.

Babchenko et al.; Fiber optic sensor for the measurement of respiratory chest circumference changes; J Biomed Opt; 4(2):224-229; Apr. 1999.

Cala et al.; Chest wall and lung volume estimation by optical reflectance motion analysis; J Appl Physiol; 81(6):2680-2689; Dec. 1996.

Chadha et al.; Validation of respiratory inductive plethysmography using different calibration procedures; Am Rev Respir Dis; 125:644-649; Jun. 1982.

Chen et al.; Color structured light system of chest wall motion measurement for respiratory volume evaluation; J Biomed Opt; 15(2):026013; Mar.-Apr. 2010.

D'Angelo et al.; A system for respiratory motion detection using optical fibers embedded into textiles; Conf Proc IEEE Med Biol Soc; 3694-3697; Aug. 2008.

Dodgson; Variation and extrema of human interpupillary distance; Prod. Of SPIE: Stereoscopic Displays and Virtual Reality Systems XI; vol. 5291; pp. 36-46; Jan. 2004.

Ferrigno et al.; Three-dimensional optical analysis of chest wall motion; J Appl Physiol; 77(3):1224-1231; Sep. 1994.

Gramse et al.; Novel concept for a noninvasive cardiopulmonary monitor for infants: a pair of pajamas with an integrated sensor module; Ann Biomed Eng; 31(2):152-158; Feb. 2003.

Heilman et al.; Accuracy of the LifeShirt (Vivometrics) in the detection of cardiac rhythms; Biol Psychol; 75(3):300-305; Jul. 2007.

Kenyon et al.; Rib cage mechanics during quiet breathing and exercise in humans; J Appl Physiol; 83(4):1242-1255; Oct. 1997.

Konno et al.; Measurement of the separate volume changes of rib cage and abdomen during breathing; J Appl Physiol; 22(3):407-422; Mar. 1967.

Lafortuna et al.; A new instrument for the measurement of rib cage and abdomen circumference variation in respiration at rest and during exercise; Eur J Appl Physiol Occup Physiol; 71(2-3):259-265; Mar. 1995.

Milledge et al.; Inductive plethysmography—a new respiratory transducer; J Physiol; 267(1):4P-5P; May 1977.

Peacock et al.; Optical mapping of the thoracoabdominal wall; Thorax; 39 (2):93-100; Feb. 1984.

Peacock et al.; Optical measurement of the change in trunk volume with breathing; Bull Eur Physiopathol Respir; 21(2):125-129; Mar.-Apr. 1985.

Pennock B.E.; Rib cage and abdominal piezoelectric film belts to measure ventilatory airflow; J Olin Monit; 6(4):276-283; Oct. 1990.

Sackner et al.; Calibration of respiratory inductive plethysmograph during natural breathing; J Appl Physiol; 66(1):410-420; Jan. 1989.

Saumarez; Automated optical measurements of human torso surface movements during freathing; J. Appl. Physiol.; 60(2); pp. 702-709; Feb. 1986.

Zimmerman et al.; Postural changes in rib cage and abdominal volume-motion coefficients and their effect on the calibration of a respiratory inductance plethysmograph; Am Rev Respir Dis; 127(2):209-214; Feb. 1983.

Chourabi et al.; Understanding smart cities: An integrative framework; 45th Hawaii International Conference on System Sciences; pp. 2289-2297; Jan. 4, 2012.

Purao et al.; Modeling citizen-centric services in smart cities; 32nd. International Conference on Conceptual Modeling; Hong Kong; pp. 438-445; (8 pages, retrieved from the Internet at https://icity.smu.edu.sg/sites/icity.smu.edu.sg/files/publications/Modeling-Citizen-centric-Services-in-Smart-Cities_ER2013.pdf); Nov. 11-13, 2013.

Longinotti_Buitoni et al.; U.S. Appl. No. 15/554,784 entitled "Laundry system for smart garments," filed Aug. 31, 2017.

(56) References Cited

OTHER PUBLICATIONS

Longinotti-Buitoni et al.; U.S. Appl. No. 15/877,378 entitled "Flexible fabric ribbon connectors for garments with sensors and electronics," filed Jan. 22, 2018.
Longinotti-Buitoni et al.; U.S. Appl. No. 15/905,811, entitled "Physiological monitoring garments with enhanced sensor stabilization," filed Feb. 26, 2018.
Hossain et al.; Human identity verification by using physiological and behavioural biometric traits; International Journal of Bioscience, Biochemistry and bioinformatics; 1(3); pp. 199-205; Sep. 2011.
Longinotti-Buitoni; U.S. Appl. No. 16/222,603 entitled "Biometric identification by garments having a plurality of sensors," filed Dec. 17, 2018.
Longinotti-Buitoni et al., U.S. Appl. No. 16/231,587 entitled "Physiological monitoring garments," filed Dec. 23, 2018.

\* cited by examiner

SYSTEMS AND METHODS TO AUTOMATICALLY DETERMINE GARMENT FIT

CROSS REFERENCE TO RELATED APPLICATIONS

This patent application claims the benefit as a continuation-in-part of International Patent Application No. PCT/US2015/010343, filed on Jan. 6, 2015 (published as WO 2015/103620), titled "SYSTEMS AND METHODS TO AUTOMATICALLY DETERMINE GARMENT FIT," which claimed priority to U.S. Provisional Patent Application No. 61/924,086, filed on Jan. 6, 2014, titled "SYSTEMS AND METHODS TO DETERMINE GARMENT FIT" each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present invention, in some embodiments thereof, relates to methods and apparatuses (e.g., systems) for determining a subject's measurements (e.g., garment "fit") using non-contact techniques by examining images of the subject. These methods typically generate anthropometric measurements of the subject that may be useful for many purposes, including but not limited to assisting in fitting garments or other wearable devices.

Thus, the invention(s) described herein, in some embodiments thereof, may relate to communication, commerce (including e-commerce), garments, and more particularly to measuring an item or person using an image capturing device.

BACKGROUND

There are many instances in which it would be helpful to measure a subject's body remotely, or via non-contact means. In one (non-limiting) example, it would be beneficial to determine a subject's measurements (and therefore garment size(s)) when shopping online, or in other situation where it is not practical or desired to take conventional measurements. It is highly desirable to determine a garment (e.g., shirt, shorts, etc.) size which fits a subject well, which can be difficult when relying on the subject measuring themselves, guessing or requiring manual assistance.

Although techniques for determining a subject's measurements remotely have been proposed by others, such as, for example, U.S. Patent Application Publication No. 2013/0179288 to Moses et al., such systems and methods are not accurate or (as in the case with U.S. 2013/0179288), require an external reference object to define a scale and to correct distortions in the image acquired by the webcam to determine the subject's measurements. However, external reference items are often inconvenient or not available, and may not be properly positioned or selected by the subject.

Described here are apparatuses (e.g., systems and devices, including computer implemented apparatuses) and methods that address many of these issues. In particular, described herein are apparatuses and methods to evaluate a subject's size on the basis of anthropometric imaging that can be easily performed by any user with a PC/smartphone equipped with a camera/webcam. These apparatuses and methods may automatically scale and measure the subject, and may thereby determine the subject's sizing (e.g., apparel sizes). The apparatuses and methods described herein do not require any external reference object, but may instead uses one or more anthropometric parameters, such as interocular distance (IOD), that can be determined automatically. The inter-subject variability of IOD is very low and therefore should introduce an error (<5%) that is acceptable for the purpose.

SUMMARY OF THE DISCLOSURE

In general, described herein are methods and apparatuses for automatically determining a subject's measurements using one or more images of the subject, where at least one image includes the subject's eyes so that an interocular distance can be determined. In any of the apparatuses (e.g., systems) and methods described, the interocular distance can be used to scale the image(s) so that measurements from the images can provide calibrated (scaled) measurements of the patient's body. These calibrated (scaled) measurements may then be used for any appropriate purpose, including estimating or otherwise determining a subject's garment size(s). Other purposes may include biometric (e.g., identity confirmation, etc.) and/or medical monitoring or identification.

In general, interocular distance may refer to the distance between a subject's eyes, typically measured face-on (e.g., in a frontal image). Interocular distance (IOD) may be interpupillary distance (IPD). Interpupillary distance (IPD) may refer to the distance between the centers of the pupils of the two eyes, and may help determine the stereo separation of the two images which are combined in the brain to produce stereo perception. Surprisingly, the inter-subject variability of IOD is very low and therefore should introduce an error (<5%) that is acceptable for the scaling/normalizing purposes described herein.

Although a single average (mean) IOD may be used to calibrate as described herein, in some variations the apparatuses or methods may select the appropriate mean IOD based on other factors, including age, race, sex, or the like. In general, any appropriate estimate for mean IPD (IOD) may be used. For example, mean IPD has been quoted in the stereoscopic literature as being from 58 mm to 70 mm, and is known to vary with respect to age, gender and race. According to some literature values (e.g., Dodgson, N. A. (2004). Variation and extrema of human interpupillary distance. *Proceedings of SPIE: Stereoscopic Displays and Virtual Reality Systems XI*, Vol. 5291, pp. 36-46), mean adult IPD is around 63 mm (>17 years old); by gender, the mean is 64.67 mm for men and 62.31 mm for women.

Thus, for example, described herein are methods of automatically determining measurements (e.g., garment sizes) for a subject using a computing device having a camera, the method comprising: determine the subject's interocular distance from a frontal image of the subject; determine a scaling factor from the subject's interocular distance; determine measurements for the subject's body from the frontal image using the scaling factor; determining a correction function based on the distance between a plane of the subject's eyes and a plane of a subject's trunk or limbs; and provide an estimate of the subject's body measurements. These body measurement estimates may be used to determine garment size(s); thus the method may also include providing estimates of garment sizes using the measurements.

Any of the methods described herein may be methods of automatically determining garment sizing for a subject using a computing device having a camera, the method comprising: receiving a frontal image of the subject including the subject's eyes; determining a scaling factor from the subject's interocular distance; scaling the frontal image using the scaling factor; determining measurements of the subject's body from the scaled frontal image; and providing an estimate of the subject's garment size using the scaling factor and subject's measurements.

In general, any of the methods described herein may include determining a correction function based on the distance between a plane of the subject's eyes and one or more other plane of a subject's body; the other plane may be the plane of or tangent to the portion of the body that is to be measured (e.g., shoulders, torso/chest, waist, etc.). The correction function ($f(x)$) may be be a function of the spacing between the plane of the subject's eyes and the other plane (where the distance is x). The function may be linear (e.g., $f(x)=C*x$, where C is a constant, such as a value between 0.1 and 0.95). The function may also be based on a surface fitting model, or may be fitted from a curve based on empirical values. The function may be first order, second order, third order, fourth order, fifth order, sixth order, etc. In some variations the function may include root function (e.g., square root) of the distance between points ($d_1$ to $d_2$) on the body and the distance, x, between the planes.

In general, using the scaling factor and correction function may comprises adding the correction function to the scaling factor (e.g., scaling in distance units/pixel may be equal to scaling factor+$f(x)$). The distance units may be any appropriate distance units (matched to the units of the correction function, such as mm, inches, etc.).

Any of the methods described herein may use more than one image of the subject. In general, at least one image (a first image) shows the subject's body including at least the eyes and one other body part (e.g., the head), from which IOD may be determined to determine a scaling factor. Dimensions (measurements) of the other body part (e.g., head) may then be calculated from the first image and used to scale any other (e.g., second, third, etc.) images that include at least the one other body part, by using the calculated dimensions of the (scaled) other body part to scale the other images. The first image may generally be a frontal image (or at least the front of the face) so that the IOD can be estimated. The additional images, e.g., second image, typically show other angles or views of the subject's body, including the sagittal (side), back, etc.

For example, described herein are methods of automatically determining garment sizing for a subject using a computing device having a camera; any of these methods may include: receiving a frontal image of the subject including the subject's eyes and a first body part; determining a scaling factor from the subject's interocular distance; receiving a second image of the subject including the subject's first body part, wherein the second image is taken from a perspective different than the first image; scaling the frontal image including the first body part using the scaling factor; scaling the second image using a dimension of the scaled first body part; determining measurements of the subject's body from the scaled second and frontal images; and providing an estimate of the subject's garment size using the measurements.

Any or all of the methods described herein (including some or all of these steps) may be performed by a computer processor, e.g., microprocessor. In particular, these methods may be performed by software, firmware, hardware, or some combination thereof. Any of these methods may be performed, for example, as part of an executable (non-transient) program, or "application" that may configure the processor of computer, including particularly a mobile telecommunications device such as a smartphone, tablet (e.g., iPhone™) or the like.

Any of these methods may also include the step of taking the one or more (including the frontal) image of the subject. The method may automatically recognize the subject's eyes. Determining the scaling factor may comprise determining the distance between the centers of the subject's pupils, the distance between a "center" of the eyes, or the like.

Any of these methods may also include the step of receiving one or more of: a subject's age, gender, and race; as mentioned above, these parameters may further refine the reference IOD used to normalize the image(s). For example, determining the scaling factor may comprises using the subject's interocular distance (IOD) and one or more of the subject's age, gender, and race, e.g., by selecting a reference IOD based on one or more of the subject's age, race and gender (sex).

Scaling of the second image may comprise using the scaling factor to determine a size of the first body part from the frontal image and scaling the first body part in the second image using the size of the first body part from the frontal image.

Also described herein are non-transitory computer-readable storage medium storing a set of instructions capable of being executed by a computing device, that when executed by the computing device causes the computing device to determine a subject's body measurements from one or more images of the subject using the IOD to scale the images.

For example a non-transitory computer-readable storage medium storing a set of instructions capable of being executed by a computing device, that when executed by the computing device causes the computing device to determine a subject's interocular distance from a frontal image of a subject that includes the subject's eyes; determine a scaling factor from the subject's interocular distance; determine measurements of the subject's body from the frontal image using the scaling factor; and provide an estimate of the subject's garment size using the measurements. As mentioned, the computing device may be a smartphone. The set of instructions, when executed by the computing device, may further cause the computing device to take a frontal image of the subject and/or additional images of the subject, and/or guide an operator (e.g., the subject) in taking the appropriate images.

The set of instructions, when executed by the computing device, may further cause the computing device to automatically recognize the subject's eyes. The set of instructions, when executed by the computing device, may further cause the computing device to determine the scaling factor using the subject's interocular distance and one or more of the subject's age, gender, and race.

In some variations, a non-transitory computer-readable storage medium storing a set of instructions capable of being executed by a computing device, that when executed by the computing device causes the computing device to: determine a subject's interocular distance from a frontal image of a subject that includes the subject's eyes; determine a scaling factor from the subject's interocular distance; determine a scaled dimension of a first body part from the frontal image of the subject and the scaling factor; scale a second image of the subject using the scaled dimension of the first body part; determine measurements of the subject's body from the frontal image using the scaling factor and the scaled second image; and provide an estimate of the subject's garment size using the measurements.

For example, described herein are methods of automatically determining garment sizing for a subject from a video of the subject, the methods comprising: determining the subject's interocular distance from a frontal image of the subject in the video; determining a scaling factor from the subject's interocular distance; using the scaling factor to determine measurements for the subject's body from a plurality of images of the subject's body extracted from the video; and providing an estimate of the subject's measurements appropriate for garment sizing.

Any of these method may include: receiving a video of the subject, wherein the video includes at least one frontal image of the subject including the subject's eyes, frontal images of a portion of the subject's body to be fitted, and side images of the subject's head and portion of the subject's body to be fitted; determining a scaling factor from the subject's interocular distance; using the scaling factor to scale the images of the subject's body; determining measurements of the subject's body from the scaled images; and providing an estimate of a garment size using the subject's measurements.

For example, a method of automatically determining garment sizing for a subject from a video of the subject may include: receiving a video of the subject, wherein the video includes at least one frontal image of the subject including the subject's eyes, and a plurality of images of the portion of the subject's body to be fitted, including frontal and side images; determining a scaling factor from the subject's interocular distance to convert image space measurements to distance measurements; measuring the portion of the subject's body to be fitted from the video; scaling the measurements using the scaling factor; and providing an estimate of the subject's measurements appropriate for garment sizing using the measurements of the portion of the body to be fitted.

Any of these methods may include automatically recognizing the subject's eyes. Determining the scaling factor may include determining the distance between the centers of the subject's pupils. In some variations the pupillary size (distance) may also or alternatively be used.

Any of the methods described herein may also include asking and/or receiving one or more of: a subject's age, gender, and race; further, one or more of age, gender and race may be used to estimate the scaling factor based on interpupillary distance (interocular distance) by selecting a value for the subject's actual interpupillary distance based on published values linked values within an age, gender and/or race matched group. For example, determining the scaling factor may generally comprise using the subject's interocular distance and one or more of the subject's age, gender, and race.

In any of the methods described herein, the video may comprise a continuous video scanning the subject's body including frontal and sagittal regions. As used herein a continuous video means a video that is taken without interruption, so that each frame is separated from each other by a predetermined time unit.

Providing an estimate of the subject's measurements appropriate for garment sizing may include providing measurements for one or more of: shoulder length, arm length, arm circumference, neck circumference, upper torso circumference, lower torso circumference, wrist circumference, waist circumference, hip circumference, inseam, and thigh measurement, calve measurement, etc.

Any of the methods described herein may also include providing a garment adapted to fit the subject's estimated measurements. The garment may be a stretch fabric (e.g., compression fabric) garment. In some variations, the garment may include one or more electrical elements, such as sensors and other chips, wires, or the like. Thus, any of these methods may also include determining a location for one or more biosensors to be integrated into the garment using the subject's measurements. Sensors may include electrodes, which may be specifically positioned over a subject's muscles (e.g., pectoral, bicep, etc.) for EMG measurements, and/or over the subject's heart in specific (e.g., 12-lead ECG) positions, and/or over the subject's chest (e.g., respiration sensors).

Thus, also described herein are methods of automatically determining garment sizing and positions for one or more biosensors on the garment from a video of a subject, the method comprising: determining the subject's interocular distance from a frontal image of the subject in the video; determining a scaling factor from the subject's interocular distance; using the scaling factor and a plurality of images of the subject's torso from the video taken at different angles to determine measurements for the subject's torso; and providing measurements for a compression garment to be worn by the subject using the measurements of the subject's torso, and indicating the locations for one or more biosensor to be integrated into the compression garment.

Thus, providing the measurements may comprise indicating the locations of a plurality of ECG electrodes to be integrated into the compression garment. In some variations, providing the measurements comprises indicating the locations of a plurality of respiration sensors to be integrated into the compression garment.

Also described herein are apparatuses for performing any of the methods described herein. For example, an apparatus may include software, hardware or firmware configured to control a device (e.g., a hand-held device such as a smartphone, tablet, laptop or the like) to perform any of the functions described herein. In some variations, a non-transitory computer-readable storage medium storing a set of instructions capable of being executed by a computing device, that when executed by the computing device causes the computing device to: determine the subject's interocular distance from a frontal image of a subject in a video; determine a scaling factor from the subject's interocular distance; use the scaling factor and a plurality of images of the subject's body extracted from the video to determine measurements for the subject's body; and provide an estimate of the subject's measurements appropriate for garment sizing.

The set of instructions, when executed by a computing device, may cause the computing device to provide garment sizing information for a compression garment having one or more biosensors integrated therein. For example, the biosensor may comprise a plurality of ECG electrodes, and/or a plurality of respiration sensors.

The set of instructions, when executed by the computing device, may further cause the computing device to automatically recognize the subject's eyes, and/or determine the scaling factor using the subject's interocular distance and one or more of the subject's age, gender, and race, as discussed above. The set of instructions may further cause the computing device to use the scaling factor and a plurality of frontal and sagittal images from the video of a portion of the subject's body to determine measurements for the subject's body.

Also described herein are non-transitory computer-readable storage medium storing a set of instructions capable of being executed by a computing device, that when executed by the computing device causes the computing device to: determine the subject's interocular distance from a frontal image of a subject in a continuous video of the subject's head and body including at frontal and sagittal views; determine a scaling factor from the subject's interocular distance; use the scaling factor and a plurality of images of the subject's body extracted from the video to determine measurements for the subject's body; and provide an estimate of the subject's measurements appropriate for garment sizing of a compression garment including a biosensor sensor.

Any of the apparatuses or methods described herein may be configured to automatically (e.g., without additional human intervention) transmit the measurements determined directly to a fabrication device for manufacture of the garment, along with identifying information (e.g., name address, etc. for delivery). For example, a fabrication device may include a fabric cutter (e.g., a laser machine that will cut the fabric), a robotic device (robot) that may position the components, and particularly electronic components (e.g., sensors, wires, pcb, etc.), or a 3D printer that will produce the garment. In some variations the measurements may be encoded as manufacturing-device readable instructions for manufacture.

In addition, any of the methods described herein may including steps of taking the video and/or guiding the user to take the video. For example, as described in greater detail herein, a method may include a step of instructing the subject how to position the camera for taking the video. The methods and apparatuses may also include reviewing (after the video is taken or while it is taken) the video to confirm that there are sufficient views to take accurate measurements.

Any of the steps described herein may be performed remotely, e.g., by a remote server. For example, any of the steps may be performed by a remote server that analyzes the video. Because the analysis and calculation of the scaling factor, as well as the steps for determining measurements are processor-intensive, and my therefore require processing time and power that exceeds currently available mobile devices (e.g., smartphones), these steps may be performed remotely or in a distributed manner.

BRIEF DESCRIPTION OF THE DRAWINGS

FIG. 3A shows a garment including a plurality of ECG sensors and FIG. 3B shows a garment including a plurality of respiration sensors.

DETAILED DESCRIPTION

Figure 1:
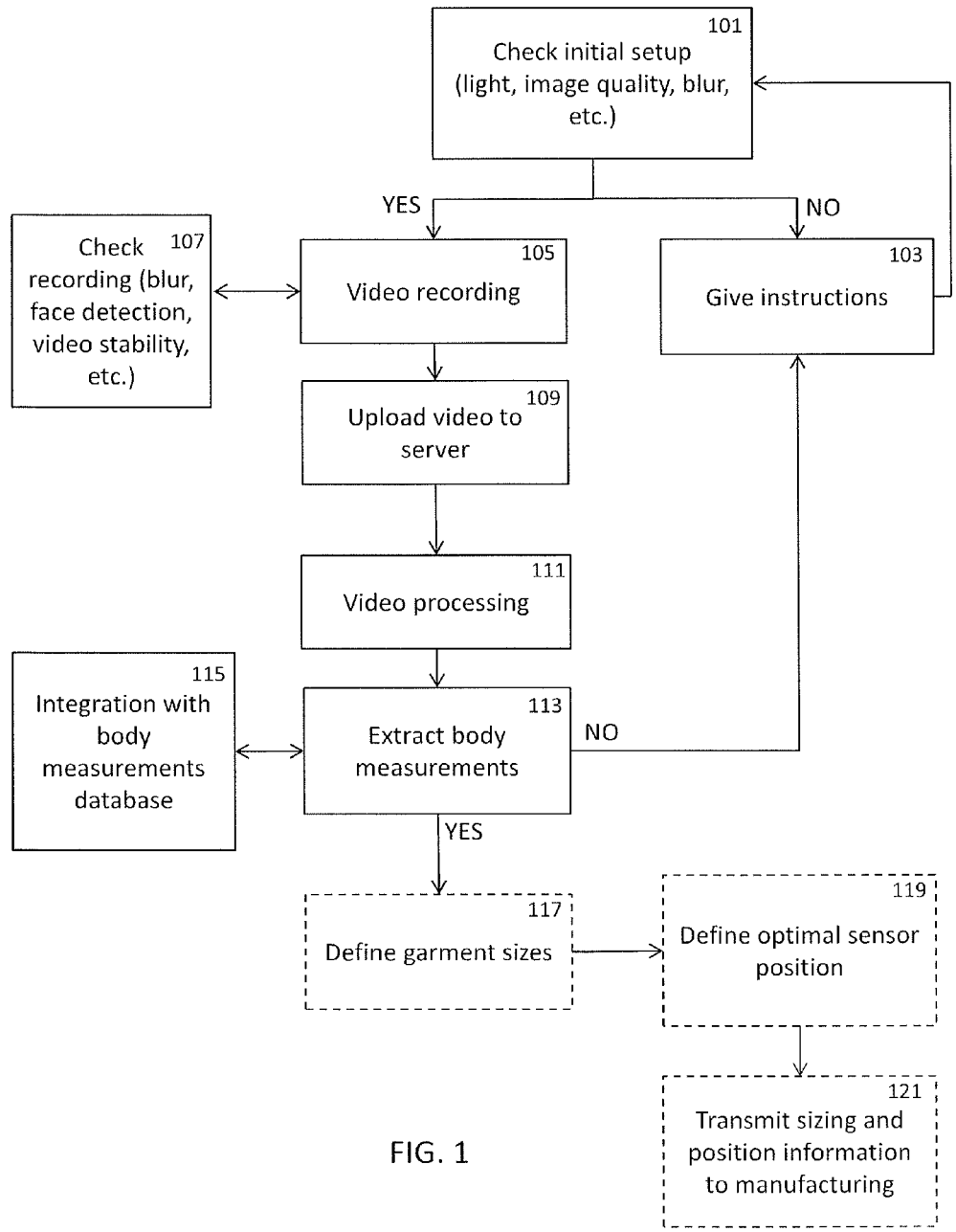
FIG. 1 is a schematic overview of a method of determining a sizing for garments, and particularly garments including one or more biosensors.

Described herein are apparatuses and methods for non-contact (and remote) measurements of a subject's body that are automatically and scaled without the necessity of an external (non-intrinsic) reference. Specifically, described herein are apparatuses, including methods and devices, that use interocular distance to automatically scale one or more images to measure the dimensions of a subject's body to provide sizing information for garments (e.g., clothing).

For example, described herein are method and apparatuses (including systems and devices) to calculate precise body measurements of a potential customer in order to ensure best possible fit of apparel components (e.g., shirts, shorts, thighs, gloves, socks, hats, balaclavas, etc.) or the optimal location on the subject's body for a device and/or garment (e.g., a collar or other component). In particular, described herein are methods of automatically determining body measurements in order to provide a fitted garment (and particularly a fitted compression garment including one or more electronic biosensors) to a subject.

In general, these methods may use a video of the user that includes images of the users head (including the eyes) and at least the portion of the body onto which the garment will be worn (e.g., from the waist to the neck for shirts, from the waist down for pants, etc.). The video may be taken as a single (continuous) video of the subject, including the front views, at least one side, and optionally the back (e.g., in a mirror or directly). The video may be taken by the user herself/himself, or it may be taken by a third party. The video may be taken, for example, using a smartphone.

In some variations the apparatus described herein may include an application (e.g. software or firmware) for controlling a computing device, such as a handheld computing device including a smartphone, tablet, etc. that includes a camera. The apparatus (e.g., application) may guide the user in taking the video, may pre-review the video to confirm it is adequate, may edit the video to remove unwanted portions, and may alert the user if the video is not sufficient.

Typically, the system automatically recognizes the two medial canthi of each eye and calculates their distance in pixels from the image showing the eyes (e.g., a frontal image). This measured distance may be transformed or correlated from pixels into known units of length (e.g., mm, inches, etc.) on the basis of known mean anthropometric parameters, such as interocular distance (IOD). In this manner, the systems and methods do not need any outside reference object in order to calibrate/scale the images. Because the inter-subject variability of IOD is very low (see, e.g., Dodgson, N. A. (2004). Variation and extrema of human interpupillary distance. *Proceedings of SPIE: Stereoscopic Displays and Virtual Reality Systems XI*, Vol.

5291, pp. 36-46; and Smith, G., & Atchison, D. A. (1997). *The eye and visual optical instruments*. Cambridge UK: Cambridge University Press) the use of a predetermined reference IOD such as 64.67 mm for males and 62.31 mm for females, may be sufficiently accurate, particularly for sizing garments, and may introduce little error (<5%).

Thereafter, the conversion factor (which may be referred to as a principle conversion factor or an IOD conversion factor may be used for all of the images in the video to covert pixels (virtual distance) to actual measurements (in distance units, such as mm, inches, etc.); when switching between the video images, the method (or any apparatus implementing the method) may also generate and/or use a second conversion factor for adjusting between video images (e.g., as the camera is moved, etc.); the second conversion factor may be used to normalize the pixel sizes between images, and then the primary or IOD conversion factor may be applied as well. By using a continuous video (e.g., taking uninterrupted video) this may be made conceptually easier. In addition, the use of continuous video may allow for virtual rotation of the individual to accurately project the subject's torso onto a normal measurement space which may reduce or eliminate errors due to viewing angle of the video images.

Thus, in general the images taken herein may be taken by one or more of a photo/video-camera on a smartphone, a photocamera, a videocamera, a webcam, or the like. In the examples described herein a video camera is used rather than a photo camera. The use of video allows the apparatus to easily determine the sequence from one frame to the next in terms of time and position between one frame to the previous or the next one. This is less reliable when performed from a sequence of non-video photos since it is difficult to calculate the time and position distance from a shot to the next. Video may also allow determination of complex measurements over highly contoured body regions (e.g., that enabling the apparatus and method to fit a shirt or pair of tights).

In any of the methods described herein, the video should generally include at least one (though multiple are preferred) image of a frontal view including the eyes and a lateral view including the head. In addition, it is helpful to provide continuous frames of imaging transitioning between these images, as well as multiple images of the body region to be measured (e.g., torso, for shirts, etc.) from multiple different angles. From these information, the calculated the size ratio (calibration factor) in mm/pixel may be determined.

Thus, the same images may also show all the body segments that are needed to be determined in order to take all the sizes, e.g. the width of the shoulder, the length of the arms, the width of the trunk, the width of the neck, etc. These images may then be used to project measurements of these body regions based on the video, and the conversion factor (IOD conversion factor) may allow these virtual measurements to be converted into real units (mm, inches, etc.). This may allow the method and apparatuses using these methods to correctly fit shirts, tights or other types of garments rather than simple accessories such as glasses, bracelets, watches, necklaces, belts, etc. Thus, although garments such as shirts and parts complex (and substantially more complex than jewelry and accessories such as glasses) because they cover a much wider part of the body and because there are more variances from person to person (for example a shirt could fit two difference persons as far as shoulders and arms measurements but not in stomach or chest dimensions that could present extreme variations), the methods described herein may be used to accurately determine sizing. Furthermore computerized sizing/fitting of compression garments and/or garments including electrical/electronic components such as sensors present added challenges to fitting of traditional clothes because of their enhanced functionalities: for example, they may include many sensors to gather physiological data, which may need to touch the skin where the signal is strongest. In some variations, a garment including ECG sensors (e.g., ECG electrodes) must be correctly placed near the heart a complex area since it presents substantial variances due to different sizes and positions in men's pectorals or women's breasts. Those sensors also need to function mostly in movement thus they need to be positioned in a way that they can continue to record reliable data even when changing position because of body parts movements. In addition, while traditional apparel are made of 'soft' material such as fabric, cotton, wool, etc. "smart" garments including integrated electronics may include also 'hard' materials such as wires, microchips, connectors, PCB, etc. or other 'hard' components that are not comfortable to wear. Thus to minimize discomfort it is important to locate and properly measure those parts of the body where those 'hard' materials/parts should best be located, as described herein.

One challenge in automatically determining sizing is in preparing the correct and appropriate input images. For example, one challenge of such a system that may automatically measure a body region for a garment is that the images should be easily taken by the user himself or herself, without the need for complex equipment, such as dedicated instruments to take body size measurements. Described herein are simple methods for performing these automatic measurements that may be based on devices which may be generally available to most individuals (e.g., general-purpose smartphone, photo/video cameras, webcam, etc.). Further, as another parameter, the methods descried herein may be completely automatized methods, which do not require any user intervention and that provides all final measurements in a completely automatic manner.

In general, these methods may be used to measure for garments that normally cover parts of the body that are traditionally difficult to measure virtually, such as shirts (upper body), hoodies (upper body and head), slacks and pants (lower body including thighs, buttocks, etc.); gloves (wrists and hands), socks (ankles and feet), balaclava (neck and head), etc.

In addition, the video methods described herein may also be used to measure parts of the body in movement. These methods and apparatuses may calculate the measurements to maximize the fit and the comfort of the garment, and may filter the measurements so that they can maximize fit and comfort while accepting users fashion desires.

Finally, these method and apparatuses are particularly helpful for configuring and fitting so-called 'smart' garments which may electronic components integrated into the garment, including one or more sensors (e.g., "biosensors"). For example, these methods and apparatuses may, in addition to determining fit, determine the correct sensors positioning after defining the garment measurements based on the body dimensions. Some sensors, such as ECG and EMG electrodes, must be precisely positioned in specific parts of the body in order to acquire a meaningful physiological signal. For example, pairs of EMG electrodes should be precisely placed on each muscle, to avoid noise coming from other close muscles. Similarly, ECG electrodes should not be placed on muscles such as pectorals in order to avoid the EMG noise that could override the ECG waves. Positioning of these sensors may therefore be important (e.g., for skin conductance sensing, sensors may be located from arm pits to latissamus muscles, while for EMGs, sensors may be positioned near the center of biceps).

In any of the variations described herein, the video of the subject's body may be taken so that it includes at least one image in which the eyes (in frontal images) and the head (in lateral images) are clearly framed. In addition, it would be useful to take video including these views and stay in a position which is at sufficiently 'frontal' or 'lateral' with respect to the sensor of the photo/video-camera, and to allow the photo/video camera to frame all the body segments which are needed to customize the garment, and specifically multiple views of the body regions over which the garment is to be worn (e.g., to customize a shirt, it is needed to have all the trunk, the arms and the neck).

In general, any of the apparatuses and methods described herein may be configured to take images of the head, including the face and in some variations the side of the head, to determine a scaling factor, but the same video may also provide images of the body regions, generally the trunk and/or limbs, that are being fitted automatically as described herein. The subject's trunk may generally refer to the person's body apart from the limbs and head, and may specifically include the chest, shoulders, abdomen, back, waist, hips, crotch region, buttocks, etc. The limbs typically include the arms and legs.

For example, any of the method and apparatuses described herein may include taking the video and/or instructing the user (subject) in a way to take the video to acquire the images used. As mentioned above, in some variations instructions may be provided in which the user is instructed to take a video to have, in at least one image, and preferably more images, the information described above (e.g., frontal views including the face and eyes, and body region to be fitted, transitioning to/from side/sagittal views including the head and body regions to be fitted.

In some variations the method, or an apparatus for performing the method, may include instructing a subject to take the video themselves. As mentioned, the subject may be instructed to take the video either without clothing over the region to be fitted, or in tight fitting and/or minimal clothing. For example, for measuring the torso, the subject may be instructed to remove any loose upper body clothing (e.g. ideally they should be nude and/or wearing only tight underwear or a bra, alternatively, wearing a tight compression shirts and compression tights, or less optimally, wearing a tight shirt and tight pants). For privacy sake, the video may be encrypted to prevent viewing by third parties, and the user may be provided information indicating confidentiality. In some variations the system is configured so that the video is erased or otherwise destroyed after determining measurements. In some variations the video may be modified before transmitting remotely.

For example, in some variations the video may be analyzed locally (e.g. on a handheld device such as a smartphone) to determine the interocular distance and a scaling factor before transmitting the rest of the video, including the body (e.g., all or a portion of the truck and/or limbs) to a remote server for later analysis; however the video may be modified to remove the subject's head and/or face, or to obscure the subject's head and/or face, prior to transmitting the video, e.g., to a remote server for analysis. In this example, the scaling factor and/or the interocular distance may be indicated on one or more frames of the video so that body measurements generated from the video can be properly scaled.

In one variation, the subject may be instructed to perform a series of movements to capture a continuous video with the images useful for the methods described herein. As mentioned above, in some variation the apparatus may talk the user through this process, for example, providing audible guidance to the user as they hold the video device and take the images.

In one variation the subject may be instructed to hold the video camera (e.g., phone camera, etc.) with two hands in front of them (in order to have even shoulders position, rather than holding the video camera with only one hand), with their arms extended as forward or as far as possible. This may allow them to film a larger part of the body, and may include the head and face, neck, shoulders, and upper body, including down to the belly region. The subject may tilt the video camera (e.g., phone) to capture the face and body in the video. The subject may be instructed to hold the video camera as parallel to the body as possible, for between 1-5 seconds (e.g., 3 seconds). The subject may then be instructed to hold the video camera in the right arm (e.g., straight out from the body), and lift the left arm from the side of the body and up as straight as possible to be parallel to the body, and held for 1-5 seconds (e.g., 3 seconds). Next, the user may be instructed to take the video camera in their left hand and hold the camera out from the body and move their right arm, raising the right arm from the side of the body up to a position straight out and parallel from the body (and held for 1-5, e.g., 3, seconds). The subject may then be instructed to lower the right arm and rotate the extended the left arm to their side, holding the camera parallel to the floor and in the same plane as the front of the torso to film the left side of the head, and then in a continuous movement bend your elbow to touch the trunk so as to film the left side of the head and the left shoulder. This step may be repeated with the camera a in the other hand to film the right side of the head and of the right shoulder. The subject may then bet told to bring the right arm (holding the video camera) in front of the body to take hold of the video camera with both hands again to return to the initial position and hold for the appropriate time (e.g., 1-5 seconds, such as 3 seconds). The user may then be instructed to, while preserving video camera position parallel to the body, lower it to record rest of the front lower-trunk to include upper legs (and hold for 1-5, e.g., 3 seconds). Users may also be instructed to stand with their back facing a mirror and to take a 3 seconds video of their back of the body: head, shoulders, upper trunk and lower trunk all the way down to back of upper legs. The total video typically takes no more than 20 seconds. Movements should be as steady and continuous as possible. To facilitate the operation users can play a tutorial video from the smartphone (e.g., if using an application on the smartphone) or be guided to a website providing a guide of the movements).

In some variations the user may work with a third party to take the images. The images may be similar to those taken as described above, except that user may start in a "crucifix" position, with arms as extended as possible, then rotate the arms form the side to over the head, lower the arms along the body and rotate the entire body 90° to the left for a video of the left side of the body, and further rotate the body to the left by 90° to be taken a video of the back. From the back, both arms may be lifted into the 'crucifix' position and then the arms may be lifted in an extended parallel position over the head, the hands may be lowered along the body, and the body may be rotated by 90° to the left for a video of the right side of the body.

Other movements for imaging the body either by a third party or by the user alone (and/or in front of a mirror) may be used. Generally, it is important that as much of the region of the body to be covered by the garment be imaged in the video as smoothly as possible, without stopping (introducing discontinuities in the video). In some variations the apparatus may detect problems with the video (e.g. focus, magnification, lighting levels, etc.) or may perform some image processing (e.g., detecting body position, separation of the body from background, etc.) and may instruct the subject to adjust or re-take the video accordingly.

The video may then be transmitted to a remote server (e.g., over an internet connection) for automated analysis, and/or analyzed locally (e.g., on the smartphone or computer). In some variations the apparatus may include one or more functions to allow automatic uploading of the video, including securing the transmission (e.g., by encryption, etc.). In some variations the video may be analyzed to determine the quality prior to transmission, so that the subject may be instructed to take another image. Quality may be improved by using high resolution cameras, using more frames to calculate an average size ratio (mm/pixels) instead of a single image, and/or by automatic detection and/or recognition of body features (face, eyes, head, torso, etc.) to confirm the video includes sufficient views. In general, the subject may be provided with instructions in order to improve image acquisition.

As used herein, a server may refer to an application (e.g., software, firmware, etc.) capable of accepting requests from a client and giving responses accordingly. Servers can run on any computer, including dedicated computers, which individually are also often referred to as "the server". A computer can have several servers running simultaneously. The server maybe run on a dedicated computer. Client devices (e.g., remote devices) may connect to a server through a network but may run on the same computer. In the context of Internet Protocol (IP) networking, a server is a program that operates as a socket listener.

In any of the variations described herein, the user may also provide the apparatus with additional information (e.g., gender, height, weight, etc.), which may be used by the method to refine the analysis, including the determination of a scaling factor from the interocular distance.

The video images may be filtered by digital filters in order to enhance the contrast between the body and the background, and/or to eliminate image noise. These methods may also allow the user to acquire multiple images from multiple points of views. Measurements obtained through video may be filtered through existing libraries of body measurements to further refine the measurements.

When additional information (e.g., height, weight, gender, etc.) are included, this information about the user may help to improve the measuring process. For example, weight, height and age can help the system to pre-assign the user to a specific anthropometric measurements cluster, in order to filter outliers and false positive given by external sources of noise that could affect the measurements (e.g. low light, blur).

In general, the program requires just one tool on the user's side: a device that can record video, handle basic video processing and get access to the Internet. For instance this device could be represented by the user smartphone. FIG. 1 illustrates one example of a process flow the functionalities described herein. For example, a method of automatically determining a subject's measurements for garment including wearable electronics, the method may include preparing the video (e.g., preparing the subject to take the video), including checking the initial video set-up 101. The apparatus (e.g., an application running on a smartphone) may be configured to perform this step initially, checking the video camera settings against predefined preferences for taking the video, and alerting the user if they need to adjust and/or automatically adjusting them. The apparatus may also provide instructions and/or guidance on what movements should be done to record the video. Once prepared, the video may be taken 105. The video may be vetted either during recording or after recording 107 to determine that it is sufficient for the detection, as mentioned above. Once it passes, it may be uploaded to a remote server for processing 109, 111. This generally include determining the interocular distance and measuring the body regions to fit a garment (e.g., for a shirt, measuring neck, arm length, shoulder width, upper torso, lower torso, torso length, etc.). Measurement may be made by rendering/projecting the body region of interest and using this virtual/reconstructed body to determine lengths. These measurements may then be converted to actual length measurements using the interocular distance based on the standard interocular distance parameter values and particular the intraocular distance values specific to the gender and/or age of the subject.

Video processing may be performed in parts, for example, normalizing the video images to be used to each other and in particular to the image(s) used to determine the scaling factor from the interocular distance, and/or projecting or calculating surface dimensions providing measurements of the subject's body. For example, the video processing 111 may include determining dimensions of the surface of the subject's body (e.g., by modeling and/or reconstructing a model of the subject from the video images), and then using the dimensions and the scaling factor (or alternatively, but scaling the model and/or images forming the model first, so that the dimensions are already expressed in the correct units) to determine a measurement for the body in real-world units 117 for length or areas (e.g., inches, cm, etc.). In some variations the methods and apparatuses for using them may alternatively convert these measurements into garment sizes, including standard or custom sizing units. As described in detail herein, any of the methods and apparatuses for performing them described herein may optionally include defining optimal positioning for electrical components 119 used in wearable electronics, such as sensors (e.g., electrodes, etc.), wiring (e.g., conductive traces, inks, etc.), processing elements (chips, circuits, processors, etc.), and connectors (multi-pin connectors, etc.).

Further, any of the methods and apparatuses described herein may transmit the measurements directly to a fabrication device 121. For example, any of these methods and/or systems may be connected or connectable (including directly connected or connectable) to one or more fabrication devices, such as 3D printers, laser cutters, sewing machines, etc.

Figure 3B:
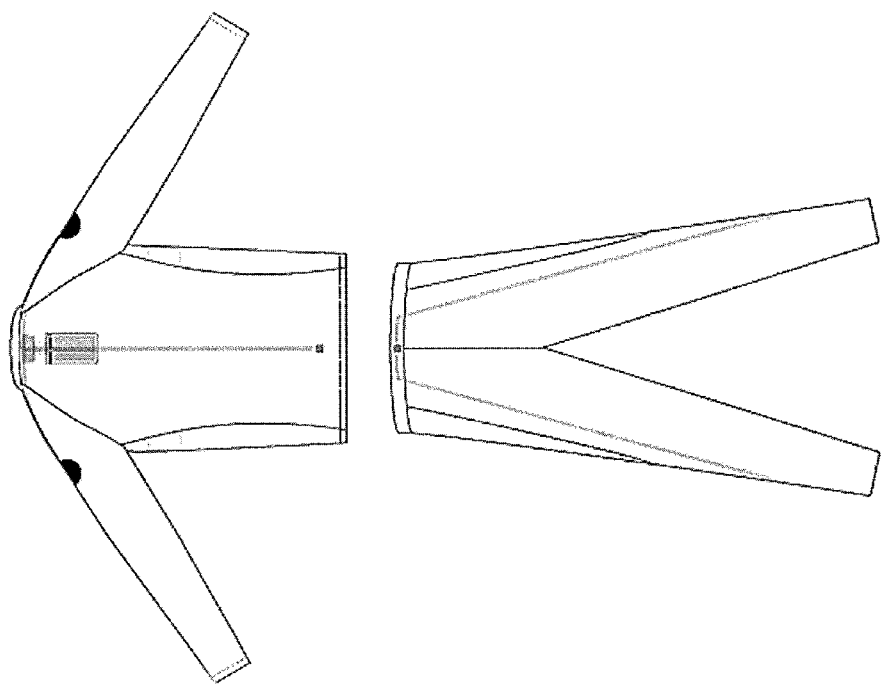
FIGS. 3A and 3B illustrate variations of compression garments including biosensors that may be automatically fitted using any of the methods and apparatuses described herein.
Figure 3A:
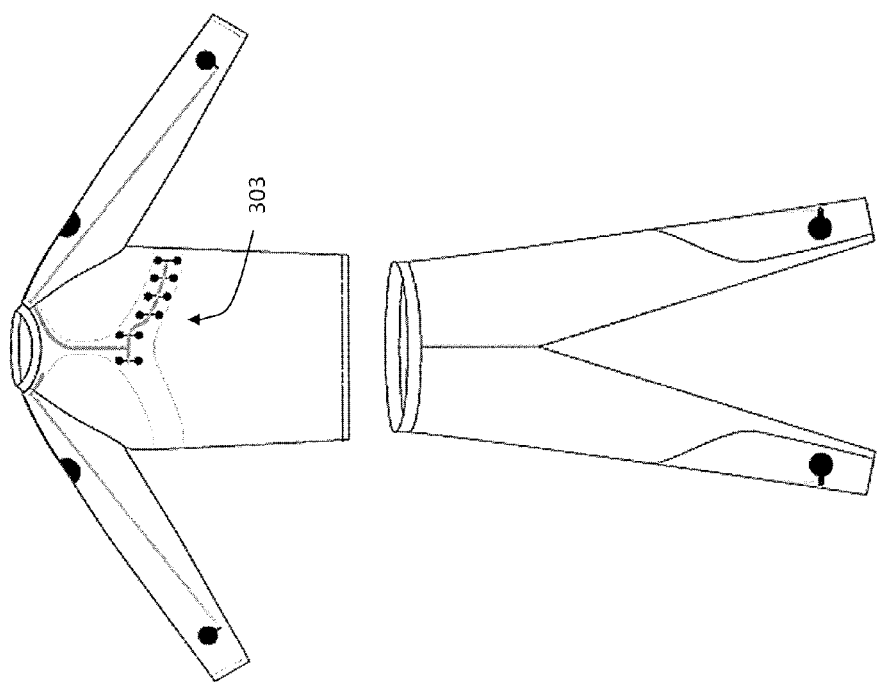

In variations in which sensors will be positioned on the body, the sensor positions may be located onto the device in predetermined locations relative to body landmarks (e.g., pectoral regions, etc.). For example, FIGS. 3A-3B illustrate one variation of a compression garment that includes a series of sensors, including sensors specific to ECG measurements. A dual series of ECG electrodes 303 may be positioned on the chest in the predetermined regions typically corresponding to the lead positions (e.g., 12 lead ECG positions). FIG. 3A shows a front view and FIG. 3B shows a back view of a garment including a shirt and pants that may be connected to each other. The location of the sensors on the chest (and writs, shoulder, ankles, etc.) may be precisely determined in an individualized and customized way using the methods and apparatuses described herein.

Figure 3C:
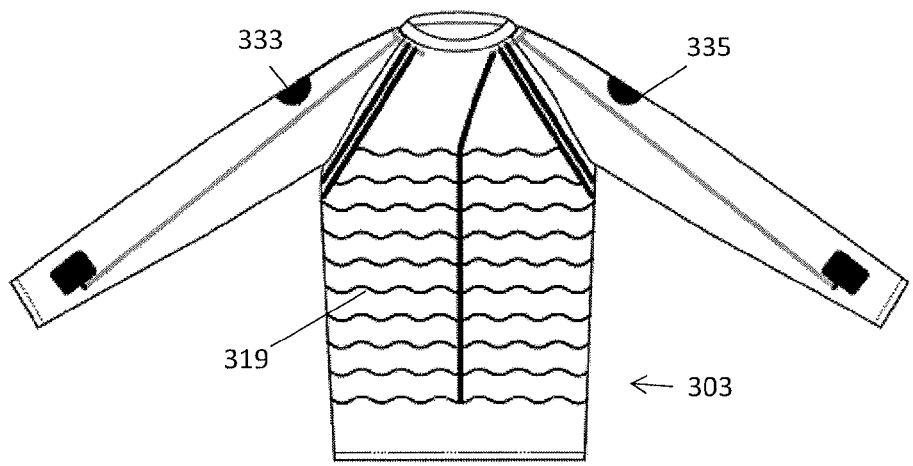
FIGS. 3C and 3D show front and back views, respectively, of another variation of a garment including a plurality of respiration sensors that may be automatically fitted using any of the methods and apparatuses described herein.
Figure 3D:
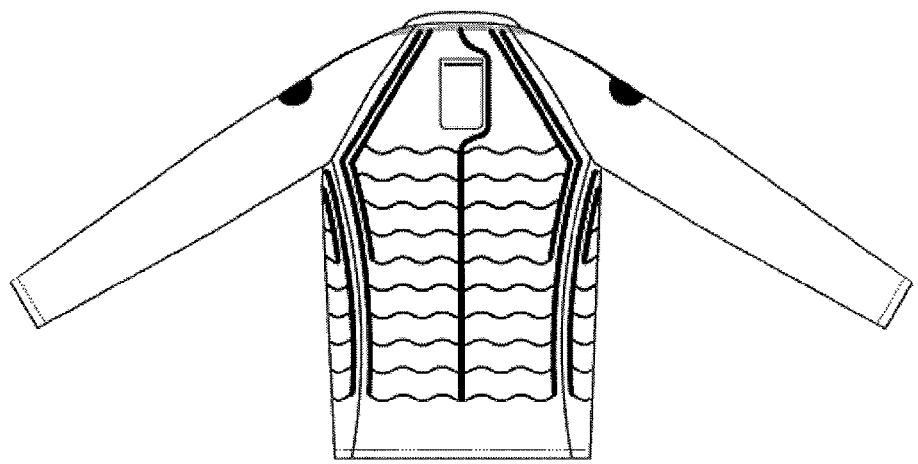

Similarly, FIGS. 3C and 3D shows front and back views, respectively, of a shirt having respiration sensors 319 around the torso. The garment 303 is a compression garment, and may include additional sensors 333, 335. The methods and apparatuses described herein may be used to precisely and customizable locate the position of the sensors on the body so that respiration may be accurately determined.

As described herein the main processing stage used to determine the body measurements and calculate the garment dimensions may be handled by a server-based program. Thus, this may be done after recording the video. The server-based program may process the video without any additional requirement for the subject and may ensure a cross-platform compatibility (because the core processing will not be dependent by different OS and hardware architectures). However in some variations, the processing may be done at least in part, if not entirely, locally (e.g., in the smartphone, laptop, desktop, etc.).

Further, even if processing of the video is done remotely, some basic checking and calculations may be performed in real-time by the part of the program responsible for recording the video, thus on the tool required on the user side, as described above. For example, the apparatus may tell the subject if the setup (e.g. environment light, image quality, blur) is suitable or not for this application. In case any parameter does not fulfill the expected requirements, the program may give instruction to the users on how to improve the setup.

After automatically checking environment parameters, the user may be allowed or instructed to start recording the video by following one of the procedure above. To facilitate the operations, users may be able to play a tutorial video that will guide them through all the necessary video steps. During the whole recording phase, other processing stages may be performed by the apparatus. For example, the apparatus may implement a face (and head) recognition feature to help the users to correctly acquire the video. In addition, this may also continuously check for some recording parameters such as blur or video stability. These parameters could affect the server-based processing, thus the users may be notified in case one of them will exceeds the expected ranges.

Once the video recording is complete, the video may be uploaded to a remote server, where it will may processed to determine the body measurements and determinate the garments sizes following the steps shown in FIG. 2, described below. The server-based processing may integrate the measurements with anthropometric database in order to filter any outliers and false positives.

When fitting for garments including electronics (e.g., wearable sensors and/or electronics), once the garment sizes are determined, the program may continue to the last processing phase in which the garment dimensions and the body measurement are used to define model that will be used to determine the optimal sensors positioning.

Figure 2:
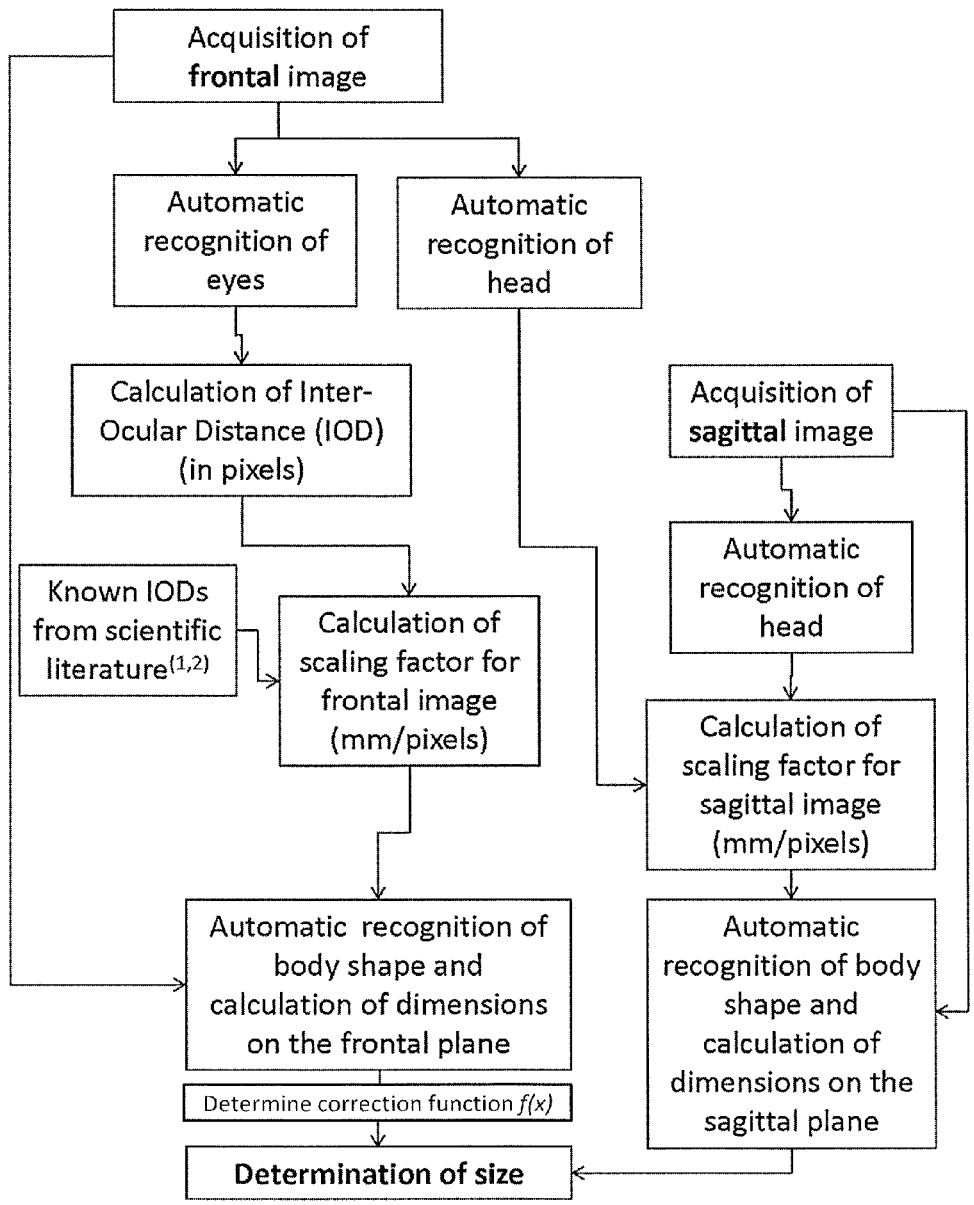
FIG. 2 is a schematic of one variation of a method for determining a subject's measurements using a frontal image to determine interocular distance (IOD).

FIG. 2 is a flowchart that schematically illustrates one methods of determining a subject's measurements (and therefore sizes) using IOD to scale/normalize images of the subject. For example, in FIG. 2, the subject stands first facing the camera of their PCs or smartphones nude or wearing compression apparel or just tight undergarment (underwear, bra, etc.). The system can then automatically calculates his/her corporeal measurements without the need of a reference object by resealing the image based on the distance between the subject's eyes. Additional views of the subject may be used. For example, the subject can stand in profile (on a side) in order to allow the calculation of additional dimensions in the sagittal view, such as antero-posterior diameters of the abdomen, of the chest, of the breast, etc. These further calculations will be based on another scaling factor calculated by referring to dimensions of body parts that are present in both the frontal and sagittal view (e.g. the height of the head).

Any of the apparatuses (e.g., systems) and methods for performing non-contact automatic estimation of garment fit from visual (e.g. video or pictures) input may include input of at least: a subject's head and face, front profile, side profile and back profile. In some variations, these images (e.g., head and face, front profile, side profile and back profile) may be sufficient, although additional images (including overlapping images) may be used. In general the methods and apparatuses described herein may not require any external reference object (e.g., having a known dimension, such as a coin, credit card, etc.), but instead uses anthropometric parameters as a reference for measurements instead; in particular, the interocular distance (IOD), which can be determined automatically, may be used as a starting reference distance for the entire measuring process. The inter-subject variability of IOD is very low and therefore should introduce an error (<5%) that is acceptable for the purpose.

In any of the variations described herein, the system and apparatus may also determine a correction factor or scaling factor to correct for the spacing between different frontal body planes (e.g., different depth of field), based on an estimate of the distance between the frontal planes (e.g., a plane of the face, from which IOD may be estimated, and a plane of the gut and/or torso). The separation between these planes may be estimated from one or more profile images taken perpendicular to the frontal planes.

For example, as discussed above, the apparatus (e.g., system) or method may first estimate the intraocular distance analyzing a picture (or video frame) in which the subject's head and face are placed right in front of the camera. The system or method may then (e.g., automatically or manually) recognize the subject's eyes and calculate the IOD in pixels. Knowing the average IOD in millimeters, a scaling factor (e.g., mm/pixel) may then be calculated as discussed and illustrated above. This scaling factor may then be used as a reference to estimate other anthropometric distances (e.g. the height/width of the head) that can be also used as a reference distance for other measurements.

After analyzing a picture of the subject's head and face, the method (or a system implementing it) may also analyze other pictures in which at least the subject front profile, side profile and back profile are shown. Considering that different anthropometric distances have already been estimated (e.g. the height/width of the head) they can be used as a reference distance to calculate new scaling factors when analyzing pictures of the subject front profile, side profile and back profile. For instance, the width of the head (which may be calculated in millimeters during the analysis of the head and face based on the IOD-determined scaling factor) may be used to calculate a scaling factor for analyzing the back profile. This new scaling factor may then be used to estimate the width of the shoulders and other anthropometric distances within the subject's back profile. Even though the system is able to calculate and use different reference distances (e.g. IOD, width or height of the head, etc.) to determine a series of translational scaling factors between different images, these measurements often refer to parts of the body placed on different planes (e.g., different frontal planes) or at different depth of field. As mentioned, an additional corrective or correctional factor based on the separation between different depth of field may be used.

Figure 4A:
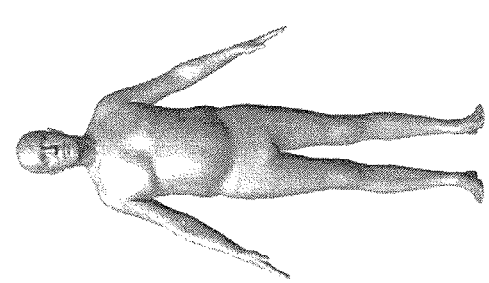
FIGS. 4A-4E illustrate front profiles (top) and side profiles (bottom) of subject's; in this example, all of the subjects have a similar front profile, but very different side profiles, which may result in similar IOD measurements and scaling factors, but may mis-represent sizing information based on these scaling factors, without further correction.
Figure 4A:
Figure 4B:
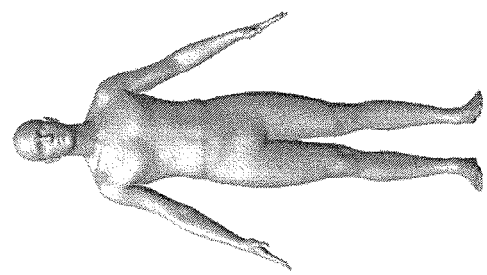
Figure 4B:
Figure 4C:
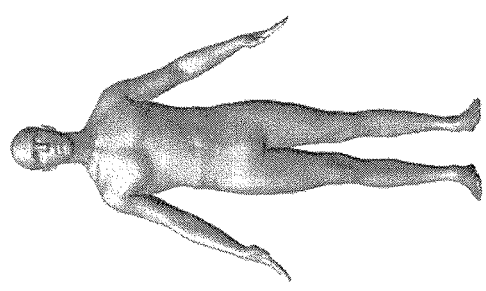
Figure 4C:
Figure 4D:
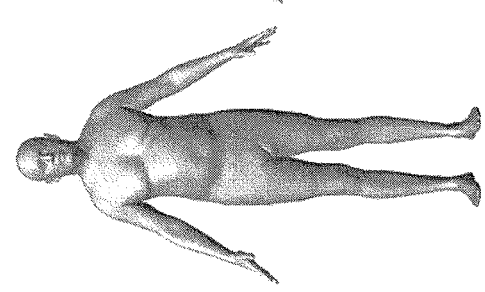
Figure 4D:
Figure 4E:
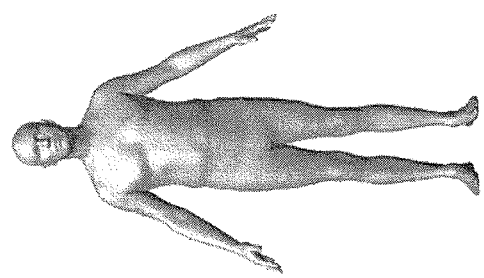
Figure 4E:
Figure 5A:
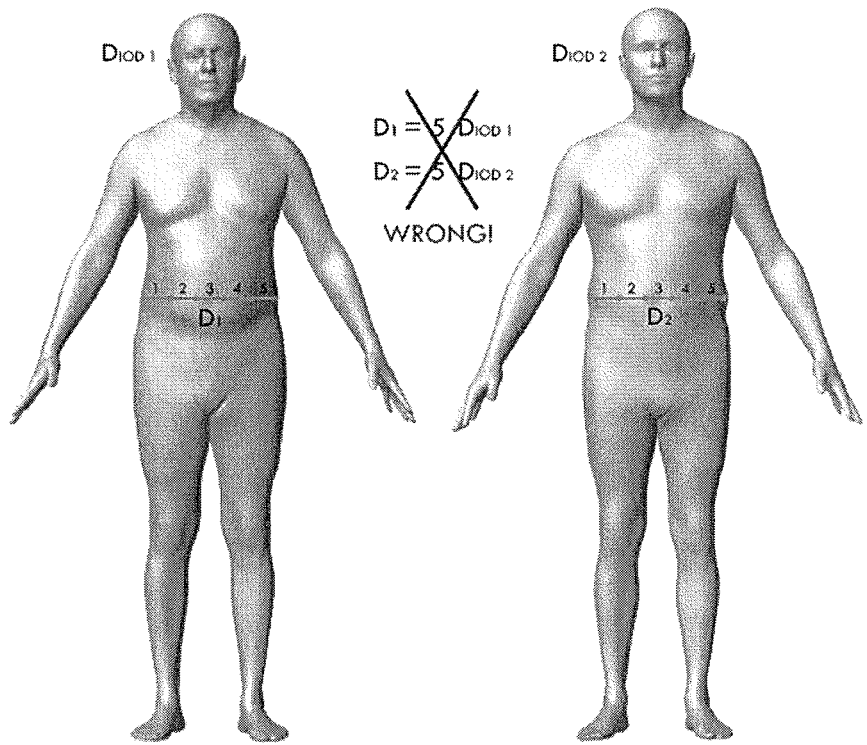
FIGS. 5A and 5B illustrate the problem of subject's having similar frontal profiles and despite having very different side profiles, as the distance between the IOD front plane and the target body region (e.g., waist, shoulder, stomach, etc.) may be dramatically different.
Figure 5B:
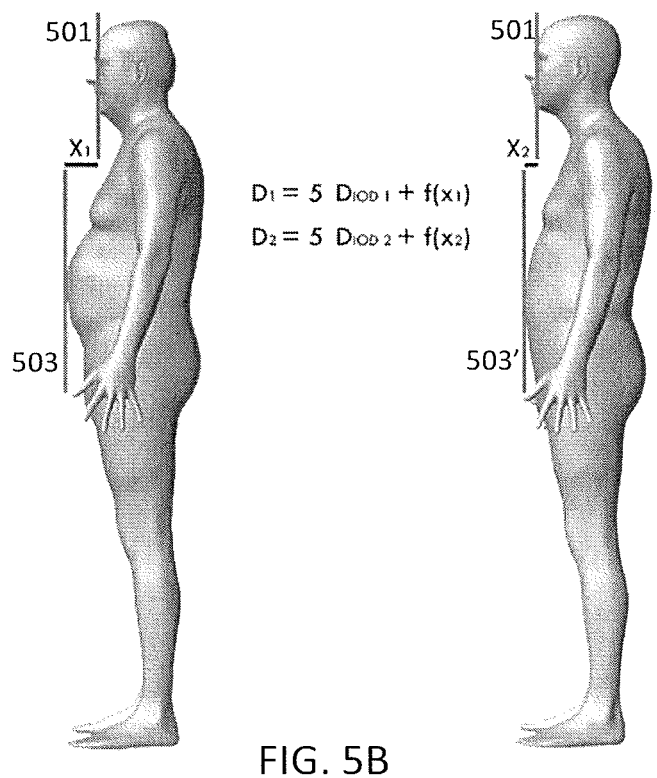

For instance, when analyzing a front profile picture, distances measured on the front plane that includes (e.g., virtually cuts) the eyes may be in a different plane that the plane tangent to the stomach, thus causing additional and unwanted errors into the distances measurement when estimating size of these out-of-plane portions of the body. See, for example, FIGS. 4A to 4E, illustrating different frontal planes. FIG. 4A, top, shows a frontal image of a subject, showing the subject's face and body, including the IOD spacing; FIG. 4A, bottom, shows a side profile, illustrating the distance between the facial (IOD) plane 401 and the subject's belly plane 403; this spacing is not apparent in the different frontal images shown in FIGS. 4B-4E, top, which otherwise look quite similar to FIG. 4A, top. As illustrated in FIGS. 5A and 5B, without correcting for the different spacing between these planes, the scaling factors used (based on the IOD and/or other landmarks, such as head size, arm/leg/hand/finger length, shoulder width, etc.) may lead to inaccuracies. In FIG. 5A, the frontal images appear nearly identical, and the scaling factors, without correction for the spacing between the different frontal planes, will be off. When determining waist and/or chest measurements for fitting a garment, as described herein, this may lead to a significant error. As illustrated in FIG. 5B, the scaling factor may be corrected by adding a correcting function ($f(x)$) based on the spacing (x) between the plane in which the scaling factor was determined (e.g., IOD facial plane 501) and the plane tangent to the body region 503, 503' for which a measurement is to be estimated, such as the torso/chest or waist (in FIG. 5B the waist is shown).

In general, this function may be a linear (e.g., first order), second order, third order, fourth order, etc., function. For example, the function ($f(x)$) may be expressed generally as a function of the distance between the planes, in (mm or pixels) and/or a function of the distance between the point(s) in the plane (e.g., the stomach plane) being determined. In general the function $f(x)$ may return a correcting value that is less than the distance between the planes.

Thus, to compensate, the method or apparatus may determine and apply a correction algorithm that compensates the different depths of fields by combining the analysis performed during the whole process. For instance from the analysis of subject's side profile, the system implementing the method may estimate the distance between the IOD plane and the stomach plane, calculating the correction factor to be applied when performing the measurements of subject front profile.

Figure 6B:
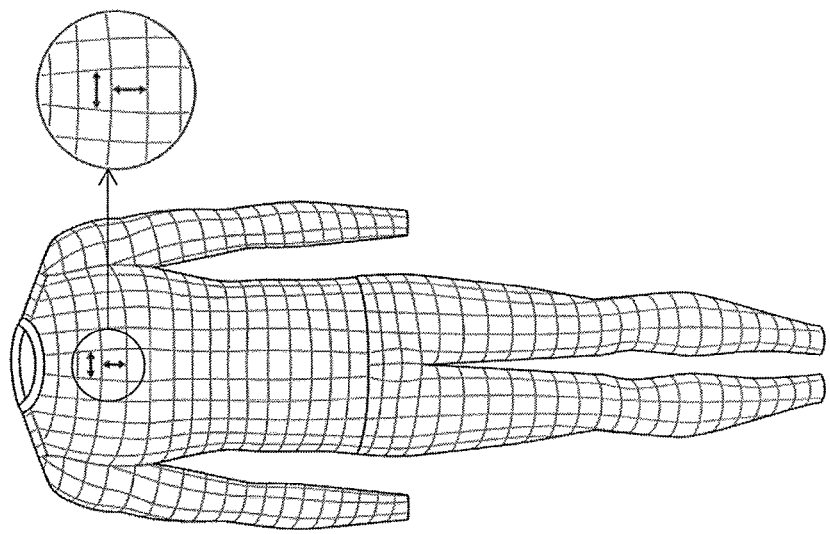
FIGS. 6A and 6B illustrate an example of a test garment (including fixed grid pattern) that may be used to determine or confirm the corrective function used with a scaling factor.
Figure 6A:
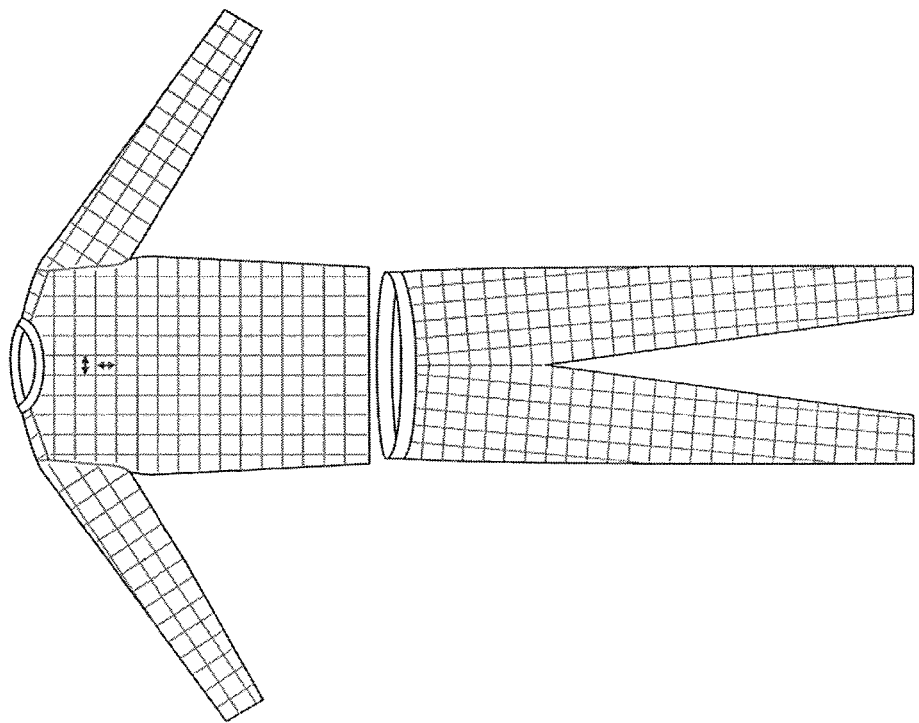

The methods (e.g., algorithms) described above may be constantly improved for accuracy and performances through machine learning and using any of the apparatuses (systems and devices) described herein. For example, an apparatus as described herein may include an upper-body and a lower-body garment with a grid design of known dimensions, which may be used to help establish and/or modify the correctional factors (f(x)) used herein. For example a grid garment such as the one shown in FIGS. 6A and 6B may be sent to subject's and their actual measurement and measurements estimated using IOD as described herein may be made, and compared to improve the accuracy of estimates. The use of such devices has proved that the general methods (e.g., algorithms) described herein are correct, and the grid design is used by a machine learning systems to ensure that all the anthropometric distances and scaling factors are accurately estimated.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of providing a garment, the method comprising:
   automatically determining garment sizing for a subject from a video of the subject's body comprising:
      determining the subject's interocular distance from a frontal image of the subject in the video;
      determining a scaling factor from the subject's interocular distance;
      determining a correction function based on a distance between a plane of the subject's eyes and a plane of the subject's trunk or limbs; and
      using the scaling factor and the correction function to determine measurements for the subject's trunk, limbs, or trunk and limbs from a plurality of images of the subject's body extracted from the video; and
   providing a garment configured to fit the subject's measurements.

2. The method of claim 1, further comprising automatically recognizing the subject's eyes.

3. The method of claim 1, wherein determining the scaling factor comprises determining the distance between the centers of the subject's pupils.

4. The method of claim 1, further comprising receiving one or more of: a subject's age, gender, and race.

5. The method of claim 1, wherein determining the scaling factor comprises using the subject's interocular distance and one or more of the subject's age, gender, and race.

6. The method of claim 1, wherein the video comprises a continuous video scanning the subject's body including frontal and sagittal regions.

7. The method of claim 1, further comprising providing an estimate of the subject's measurements appropriate for garment sizing comprising providing a shoulder, arm, neck, upper torso, and lower torso measurement.

8. The method of claim 1, further comprising determining a location for one or more biosensors to be integrated into a garment using the subject's measurements.

9. The method of claim 1, further comprising automatically transmitting the subject's measurements to a machine configured to fabricate the garment.

10. The method of claim 1, wherein using the scaling factor and correction function comprises adding the correction function to the scaling factor to determine a number of distance units per pixel.

11. A method of providing a garment, the method comprising:
    automatically determining garment sizing for a subject from a video of the subject's body comprising:
       receiving a video of the subject, wherein the video includes at least one frontal image of the subject including the subject's eyes, frontal images of a portion of the subject's body to be fitted on the subject's trunk, limbs or trunk and limbs, and side images of the subject's head and portion of the subject's body to be fitted;
       determining a scaling factor from the subject's interocular distance;
       determining a correction function based on a distance between a plane including the subject's eyes and a plane of the subject's trunk or limbs;
       using the scaling factor and the correction function to scale the images of the subject's body; and
       determining measurements of the subject's body from the scaled images; and
    providing a garment configured to fit the subject's measurements.

12. The method of claim 11, further comprising automatically recognizing the subject's eyes.

13. The method of claim 11, wherein determining the scaling factor comprises determining the distance between the centers of the subject's pupils.

14. The method of claim 11, further comprising receiving one or more of: a subject's age, gender, and race.

15. The method of claim 11, wherein determining the scaling factor comprises using the subject's interocular distance and one or more of the subject's age, gender, and race.

16. The method of claim 11, wherein the video comprises a continuous video scanning the subject's body including frontal and sagittal regions.

17. The method of claim 11, further comprising providing an estimate of the subject's measurements appropriate for garment sizing comprising providing a shoulder, arm, neck, upper torso, and lower torso measurement.

18. The method of claim 11, further comprising determining a location for one or more biosensors to be integrated into a garment using the subject's measurements.

19. The method of claim 11, further comprising automatically transmitting the subject's measurements to a machine configured to fabricate the garment.

20. The method of claim 11, wherein using the scaling factor and correction function comprises adding the correction function to the scaling factor to determine a number of distance units per pixel.

* * * * *